United States Patent [19]
Burkitt, III

[11] Patent Number: 5,167,041
[45] Date of Patent: Dec. 1, 1992

[54] SUCTION FITTING WITH PUMP CONTROL DEVICE

[75] Inventor: Garrett J. Burkitt, III, Simi Valley, Calif.

[73] Assignee: KDI American Products, Inc., Moorpark, Calif.

[21] Appl. No.: 541,138

[22] Filed: Jun. 20, 1990

[51] Int. Cl.$^5$ .............................................. E04H 4/12
[52] U.S. Cl. ........................................ 4/541.2; 4/509
[58] Field of Search .................. 4/504, 508, 509, 541, 4/542, 544; 417/40, 43, 44; 137/399, 563, 565

[56] References Cited

U.S. PATENT DOCUMENTS

| | | | |
|---|---|---|---|
| 3,759,286 | 9/1973 | Page | 4/508 X |
| 4,169,293 | 10/1979 | Weaver | 4/544 |
| 4,265,598 | 5/1981 | Brand | 417/40 |
| 4,402,094 | 9/1983 | Sanders | 4/504 |
| 4,602,391 | 7/1986 | Shepherd | 4/542 |
| 4,620,835 | 11/1986 | Bell | 4/504 X |
| 4,742,456 | 5/1988 | Kamena | 4/542 X |
| 4,817,217 | 4/1989 | Lively | 4/508 |
| 4,901,962 | 2/1990 | Klotzbach | 4/542 X |

Primary Examiner—Ernest G. Cusick
Assistant Examiner—Robert M. Fetsuga
Attorney, Agent, or Firm—Noel F. Heal

[57] ABSTRACT

A suction fitting for use in a water circulation system in which operation of a circulating pump is controlled to prevent damage to equipment and property and also to minimize the possibility of serious personal injury or death. The suction fitting includes a suction line connected to the pump, for circulating water in the tub or spa back through jets in the tub or spa, a pressure sensor line connecting the water in the tub or spa to a water level sensor, and one or more slots for water communication between the pressure sensor line and the suction line. When flow into the suction fitting is blocked, water is drawn out of the pressure sensor line and through the slots to the suction line, to permit detection of the blockage in the level sensor. The combination of the suction fitting, the pump and the water level sensor turn off the pump when the suction fitting is blocked or when the water level in the tub or spa is too high or too low.

14 Claims, 4 Drawing Sheets

SUCTION FITTING WITH PUMP CONTROL DEVICE

BACKGROUND OF THE INVENTION

This invention relates generally to suction fittings for use with circulating pumps in spas and tubs and, more particularly, to suction fittings as used in combination with pump control devices.

Hot tubs and spas are generally equipped with pumps for the circulation of water. Although some of these pumps are run indefinitely most use a timer for safety reasons, and some use a level sensor to preclude their operation when the water level is low. If a circulating pump were run indefinitely, continuous safe operation would not be assured and possible damage could result. A condition such as low water level could cause the pump to burn out or cause the water jets to spray out of the tub area. A related difficulty is that a person entering or leaving the tub or spa causes undesirable changes in the water level. Too high a level may result in overflow of the tub. Too low a level may uncover the water jets. The use of a timer to control operation of the pump does not adequately address these problems.

Some tubs or spas use a level sensor to control the operation of the pump. A hole is required to be drilled in the wall of these tubs or spas and a fitting installed for connecting an air hose. These fittings increase the chance of leaks by increasing the number of holes in the walls of the tub or spa. These sensors also become inoperative if the hose becomes dislodged.

An important problem with suction fittings arises from blockage of the fitting itself. Foreign objects, such as hair, skin or even a person leaning against the fitting can cause a permanent or temporary blockage, during which the pump will operate unsafely. Blocking the suction fitting with hair or the body can cause serious personal injury or death. While suction fittings are designed to operate safely within a rated flow range, if that flow range is exceeded entrapment can occur. Using a timer or level sensor will not alleviate this problem.

It will be appreciated from the foregoing that there is a need for improvement in the field of suction fittings for water circulation systems. In particular, there is a need for a suction fitting that can operate in conjunction with a pump control device to prevent operation of the pump during unsafe conditions such as blockages. The present invention satisfies this need.

SUMMARY OF THE INVENTION

The present invention resides in a suction fitting for use with a circulating pump and a sensor that deactivates operation of the pump during unsafe conditions. Briefly and in general terms, the invention includes a suction fitting for installation beneath fluid level in a tub or spa to provide fluid communication between the tub or spa and the fluid circulation pump, and means for controlling operation of the pump in response to a condition in which fluid flow through the suction fitting to the pump is impeded whereby the possibility of damage or serious personal injury is minimized.

More specifically, the means for controlling operation of the pump in response to a condition in which flow through the pump is impeded includes means for sensing blockage of flow through the suction fitting, and means for deactivating the pump in the event that a blockage is sensed by the means for sensing the blockage of flow.

The means for sensing blockage of flow includes pressure sensing means for sensing reduced pressure in a region downstream of a potential blockage site in the suction fitting. The pressure sensing means includes a fluid level sensor and a fluid line in fluid communication with the region downstream of the potential blockage site and with the fluid level sensor. A blockage in the suction fitting inherently results in a lower pressure in the downstream region, and, therefore a lowered fluid level in the fluid level sensor. The fluid level sensor also functions to detect high or low fluid level in the tub or spa, and in the preferred embodiment is a float assembly.

The suction fitting includes a protective covering on the inside of the tub or spa to prevent foreign objects from entering the fitting.

The float assembly activates a switch for regulating an electrical device which, in the preferred embodiment, is a pump or alarm.

The method for using the fluid circulation apparatus includes drawing fluid from the tub or spa into the suction fitting for flow to the pump, sensing the pressure in the downstream region because blockage of the suction fitting results in a lower pressure in the downstream region, and regulating the operation of an electrical device. The method of sensing the pressure in the downstream region includes sensing the fluid level at the suction fitting so that a condition of too high or too low a fluid level or blockage of the fitting itself causes deactivation of the pump. The method of controlling operation of an electrical device may include activating an alarm if the fluid level is too high and damage could occur.

It will be appreciated from the foregoing that the present invention represents a significant advance in the field of suction fittings for use with circulating pumps for tubs or spas as used in combination with pump control devices. In particular the invention provides a suction fitting with a means for detecting blockage of the suction fitting as well as too high or too low water level in the tub or spa and controlling the pump in response to these conditions to prevent operation of the pump during unsafe conditions and minimize the possibility of serious personal injury or death. While suction fittings are designed to operate safely within a rated flow range, if that flow range is exceeded entrapment can occur. This device will operate safely at all flows because it deactivates the pump if entrapment or blockage occurs. Other aspects and advantages of the invention will become apparent from the following more detailed description, taken in conjunction with the accompanying drawings.

DESCRIPTION OF THE PREFERRED EMBODIMENT

Figure 1:
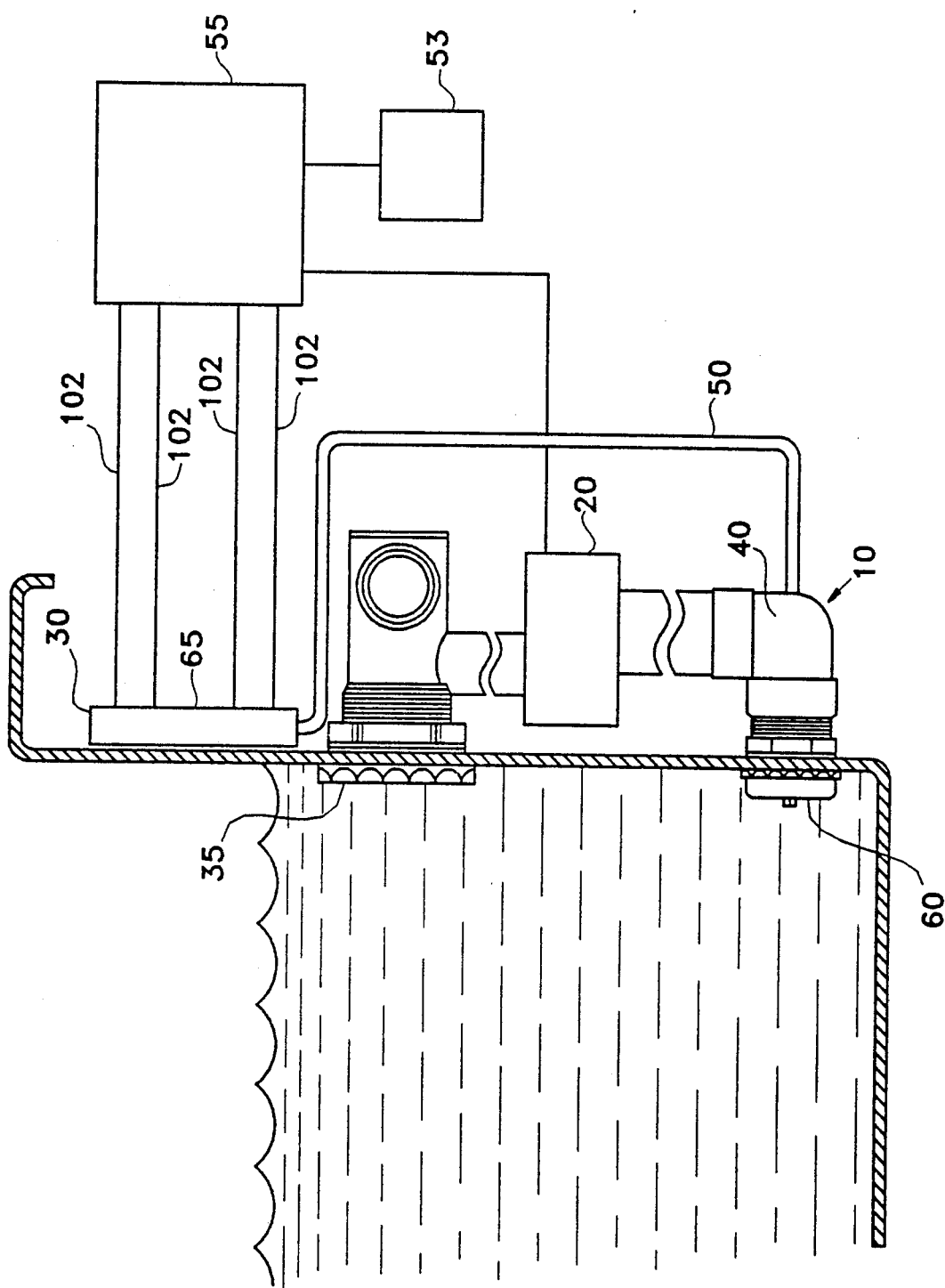
FIG. 1 is a diagrammatical view of the fluid circulation apparatus embodying the invention.

As shown in the drawings for purposes of illustration, the present invention is concerned with improvements in the field of suction fittings for use with water circulating pumps, particularly for spas and tubs. A suction fitting provides a fluid communication passage between water in the tub or spa and a suction line leading to a circulating pump. Typically, the pump was either run indefinitely, or was regulated by a timer or an independent level sensor. In either case, the pump might be operated during unsafe conditions and damage could result.

Use of an independent level sensor increases the likelihood of leaks, because an additional opening must be made in the wall of the tub or spa for installation of the sensor. Another drawback is that the level sensor could become dislodged, and therefore become inoperative.

None of these methods of controlling the operation of the pump take into consideration the possibility that the suction fitting itself might become blocked, with the possibility of the result being serious personal injury or death and the pump operating unsafely. The suction fitting can become blocked with foreign objects, such as hair or skin, or can become blocked by someone leaning against the fitting.

In accordance with the present invention, the fluid circulation apparatus for a tub or spa includes a suction fitting 10 for installation beneath water level in a tub or spa, a pump 20 for circulating the water back to the tub or spa, and a water level sensor 30 for sensing the pressure in the suction fitting and deactivating the pump if the pressure within the suction fitting decreases below a preselected level. The pump 20 is connected to the suction fitting 10 and to the spa jets installed in the tub wall, one such jet being shown at 35. The pump 20 draws water from the tub through the suction fitting 10, and discharges the water back into the tub through the spa jets 35.

Figure 2:
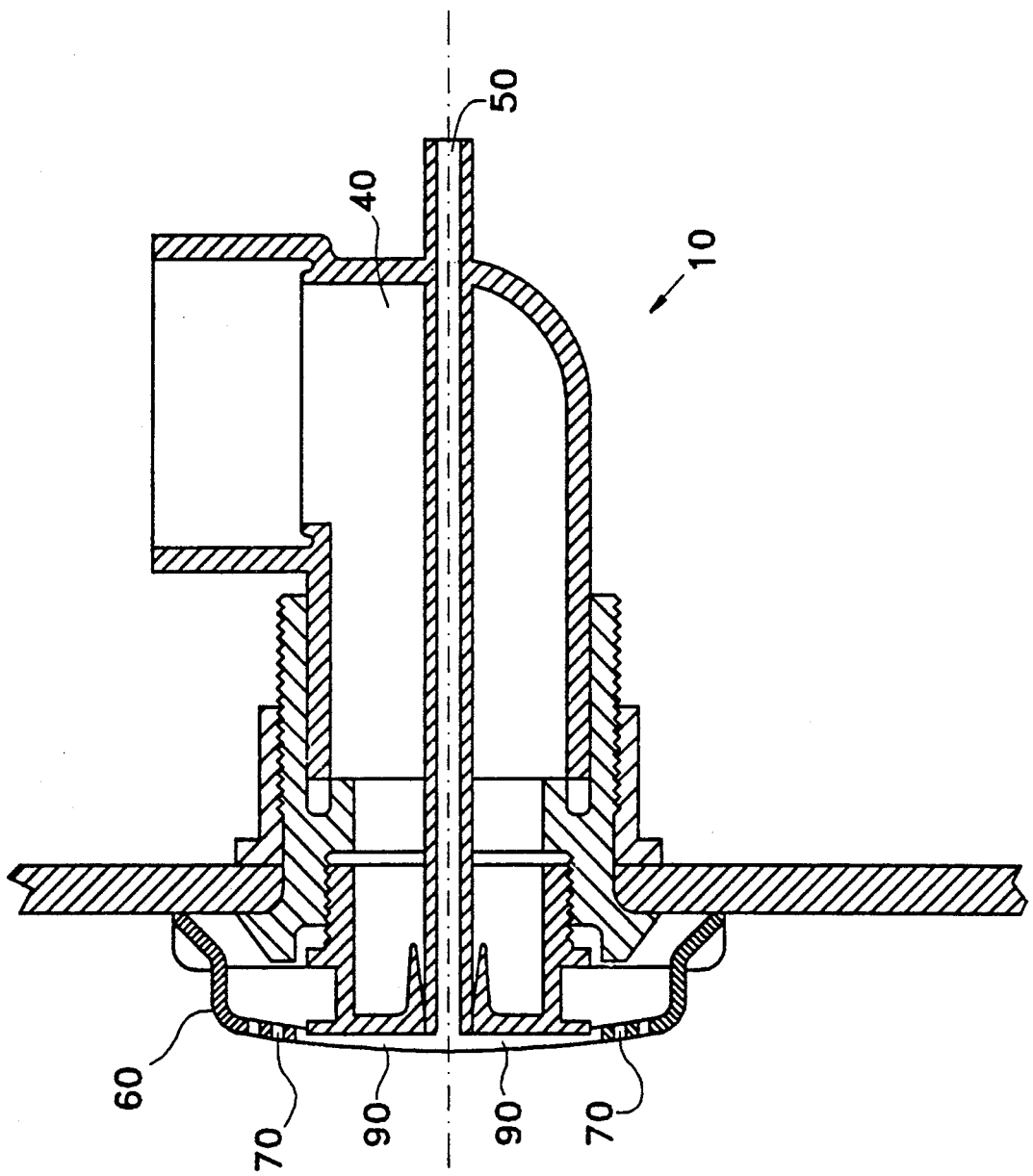
FIG. 2 is an enlarged sectional elevational view of the suction fitting of the invention.

The suction fitting 10 includes a suction fluid line 40 for connecting the water in the tub or spa and the circulation pump 20, a pressure sensor line 50 for connecting the water in the tub or spa with the water level sensor 30, and a protective covering 60 to prevent foreign objects, such as hair or skin, from entering the suction fitting. FIG. 2 shows these elements in more detail.

Figure 4:
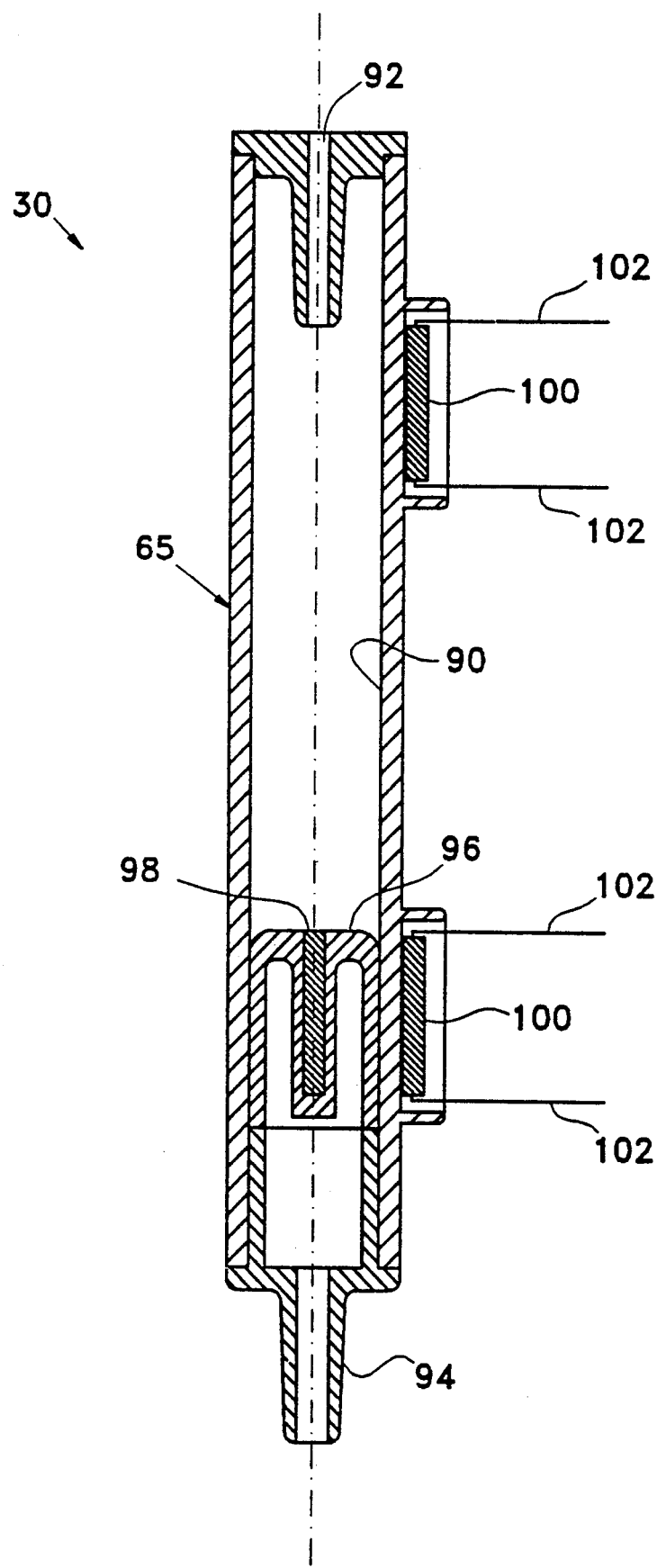
FIG. 4 is an enlarged sectional elevational view of the float assembly for level sensing in the invention as shown in FIG. 1.

In the preferred embodiment of the invention, the pressure sensor line 50 is an integral part of the suction fitting 10 and eliminates the need for an additional opening in the tub or spa wall for level sensing. Also in the preferred embodiment, the water level sensor 30 is a float assembly 65 located on the outside and under an exterior lip of the tub or spa. This location allows the float assembly 65 to deactivate the pump 20 and activate an alarm 53 (FIG. 1) if the fluid level reaches a potential overflow condition that could cause damage to equipment or surrounding property. As shown in FIG. 4, the float assembly 65 includes a float chamber 90 having a vent hole 92 at its upper end and an integral nipple 94 at its lower end for connection to the sensor line 50. A float 96 moves up and down in the chamber 90 as the water level rises and falls. The float 96 carries a permanent magnet 98, and can operate either of two magnetic switches 100 mounted outside the float chamber 90. The switches 100 are positioned to define a prescribed safe zone for the sensed water level. Therefore, movement out of the prescribed safe region causes the activation of one of the magnetic switches 100, each of which is connected by lines 102 to a control box 55 (FIG. 1), and resultant deactivation of the pump 20 or activation of the alarm when an adverse condition exists, such as the fluid level in the tub or spa being too high or too low, or when the suction fitting itself is blocked.

Figure 3:
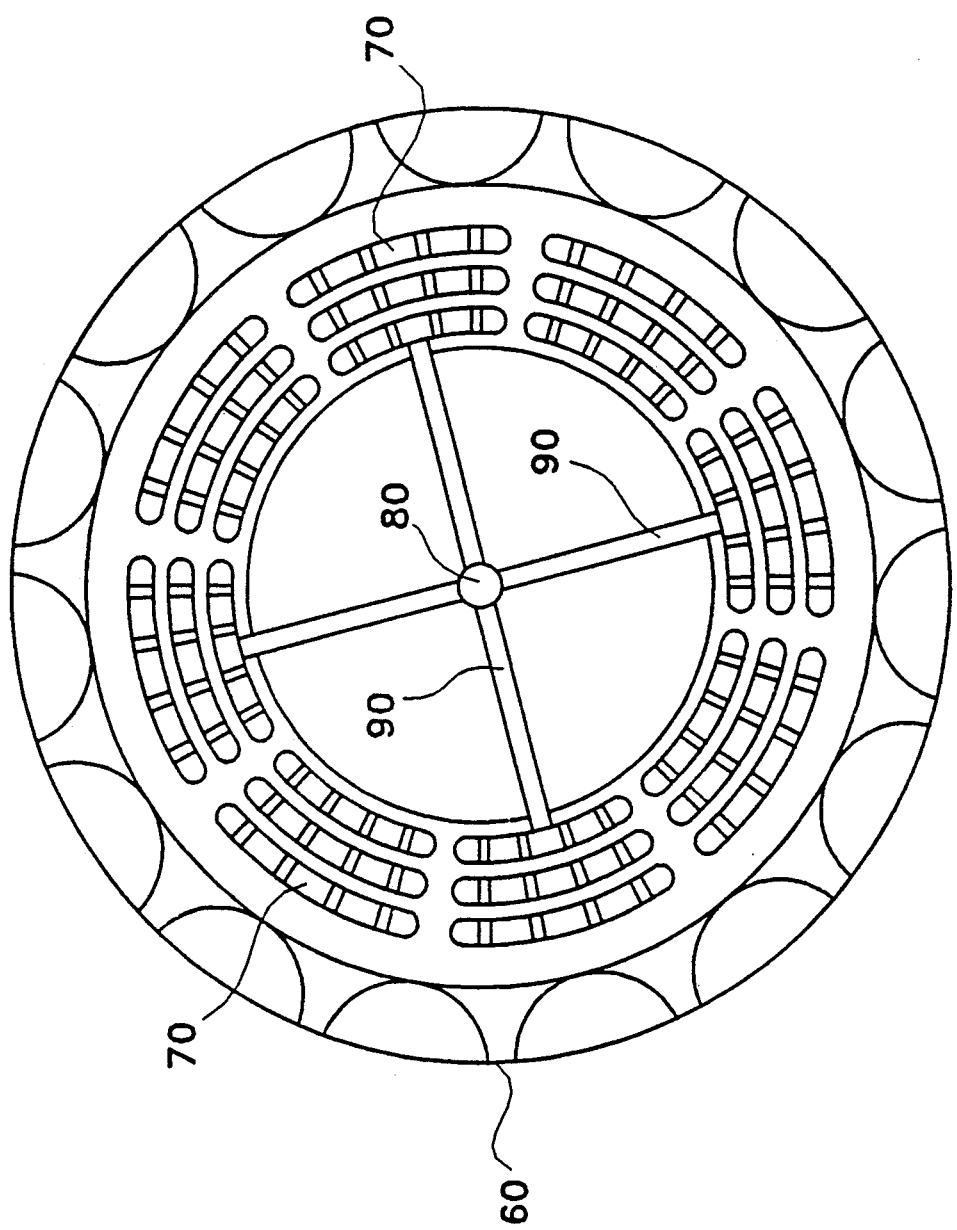
FIG. 3 is a further enlarged front view of a protective covering for the suction fitting of FIG. 2.

The protective covering 60 for the suction fitting 10, as shown in FIG. 3, is circular in shape to cover the opening of the suction fitting into the tub or spa. The covering 60 has a central opening 80 for the pressure sensor line 50, and a plurality of suction openings 70, forming a grid around the central opening to allow the water to be drawn through the openings 70, and thence into the suction line 40. The protective covering 60 has a plurality of slots 90 radiating from the central opening 80 to connect with the suction openings 70. These slots 90 permit the water in the pressure sensor line 50 to flow into the suction line 40 in the event the suction fitting 10 becomes blocked and pressure in the suction line is thereby reduced. The water level sensor 30 will then sense a reduced pressure at the suction fitting, and will deactivate the pump 20 to prevent the possibility of serious personal injury or death.

It will be appreciated from the foregoing that the present invention represents a significant advance in the field of fluid circulation equipment. In particular, the invention controls the operation of a circulation pump, preventing the possibility of serious personal injury or death and damage to equipment and surrounding property. While suction fittings are designed to operate safely within a rated flow range, if that flow range is exceeded entrapment can occur. This device will operate safely at all flows because it disables the pump if blockage occurs. It will also be appreciated that, although a specific embodiment of the invention has been described in detail for purposes of illustration, various modifications may be made without departing from the spirit and scope of the invention. Accordingly, the invention is not to be limited except as by the appended claims.

I claim:

1. For use in conjunction with a fluid circulation system in a tub or spa, a combination comprising:
    a suction fitting for installation beneath fluid level in a tub or spa, to provide fluid communication between the tub or spa and a fluid circulation pump;
    pressure sensing means integral with the suction fitting, for sensing fluid pressure in the tub or spa during normal operation and for sensing reduced pressure immediately downstream of a blockage in the suction fitting; and
    means for controlling operation of the fluid circulation system in response to a condition in which fluid flow through the suction fitting is impeded, as detected by the pressure sensing means;
    whereby the possibility of damage or serious personal injury is minimized;
    and wherein the pressure sensing means includes
    a sensor tube extending through the suction fitting and having an opening into the tub or spa; and
    fluid communication means extending from the opening of the sensor tube to a region immediately downstream of the suction fitting, whereby the pressure sensing means can detect a reduced pressure immediately downstream of the blockage.

2. A combination as defined in claim 1, wherein:

the suction fitting includes a cover having suction openings through which fluid can be drawn from the tub or spa; and the fluid communication means includes said suction openings and a plurality of channels formed on the cover between the opening of the sensor tube and the suction openings, whereby at least one of the channels completes the fluid communication means in the event of a blockage overlaying part of the cover.

3. A combination as defined in claim 2, wherein the means for controlling operation of the fluid circulation system includes:

a fluid level sensor connected to the sensor tube; and means coupled to the fluid level sensor, for generating an electrical signal for controlling operation of the circulation system when the fluid level passes through one or more selected threshold levels.

4. A combination as defined in claim 3, wherein the fluid level sensor includes:

a float; and at least one magnetically actuated switch located adjacent to the float, and operative when the float passes through one of the selected threshold levels.

5. A combination as defined in claim 4, wherein:

the means for generating an electrical signal is coupled to the circulation pump, to deactivate the pump in the event of a blockage.

6. A combination as defined in claim 4, wherein:

the means for generating an electrical signal is coupled to an alarm.

7. A combination as defined in claim 1, wherein the means for controlling operation of the fluid circulation system includes:

a fluid level sensor connected to the sensor tube; and means coupled to the fluid level sensor, for generating an electrical signal for controlling operation of the circulation system when the fluid level passes through one or more selected threshold levels.

8. A combination as defined in claim 7, wherein the fluid level sensor includes:

a float; and at least one magnetically actuated switch located adjacent to the float, and operative when the float passes through one of the selected threshold levels.

9. A combination as defined in claim 7, wherein:

the means for generating an electrical signal is coupled to the circulation pump, to deactivate the pump in the event of a blockage.

10. A combination as defined in claim 7, wherein:

the means for generating an electrical signal is coupled to an alarm.

11. A method for operating a fluid circulation system, comprising the steps of:

drawing fluid from a tub or spa through a suction fitting to a fluid circulation pump, for recirculation back to the tub or spa;

sensing, with a single sensor tube, the fluid pressure in the tub or spa during normal operation, and a reduced pressure immediately downstream of the suction fitting when there is a blockage in the suction fitting; and controlling operation of the fluid circulation system in response to a condition in which fluid flow through the suction fitting is impeded, as detected by the sensing step;

whereby the possibility of damage or serious personal injury is minimized;

the suction fitting includes a cover having suction openings and a sensor opening to which the sensor tube is connected; and the sensing step further includes providing at least one channel across the cover between the sensor opening and the suction openings, wherein, upon the occurrence of a blockage overlaying the cover suction openings, the channel provides fluid communication between the sensor tube and a region immediately downstream of the suction fitting, thereby sensing the blockage.

12. A method as defined in claim 11, wherein the step of controlling operation of the circulation system includes:

connecting the sensor line to a fluid level sensor; and generating an electrical signal when the sensed fluid level passes a selected threshold.

13. A method as defined in claim 12, wherein the step of controlling operation of the circulation system further comprises:

deactivating the pump in the event that a blockage is sensed and the fluid level sensor passes through a selected low threshold.

14. A method as defined in claim 12, wherein the step of controlling operation of the circulation system further comprises:

activating an alarm if the fluid level sensor passes through a selected high threshold.

* * * * *